US009465610B2

(12) United States Patent
Suzuki et al.

(10) Patent No.: US 9,465,610 B2
(45) Date of Patent: Oct. 11, 2016

(54) THREAD SCHEDULING IN A SYSTEM WITH MULTIPLE VIRTUAL MACHINES

(71) Applicant: Renesas Electronics Corporation, Kawasaki-shi (JP)

(72) Inventors: Hitoshi Suzuki, Kanagawa (JP); Koji Adachi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 803 days.

(21) Appl. No.: 13/859,200

(22) Filed: Apr. 9, 2013

(65) Prior Publication Data

US 2013/0297916 A1    Nov. 7, 2013

(30) Foreign Application Priority Data

May 1, 2012    (JP) .................................. 2012-104577

(51) Int. Cl.
*G06F 9/30* (2006.01)
*G06F 9/38* (2006.01)
*G06F 9/50* (2006.01)
*G06F 9/48* (2006.01)

(52) U.S. Cl.
CPC ........... *G06F 9/3001* (2013.01); *G06F 9/3009* (2013.01); *G06F 9/38* (2013.01); *G06F 9/3836* (2013.01); *G06F 9/3851* (2013.01); *G06F 9/4881* (2013.01); *G06F 9/5077* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 5,987,557 A * | 11/1999 | Ebrahim | ............. | G06F 12/1483 710/200 |
| 6,985,951 B2 * | 1/2006 | Kubala | ................. | G06F 9/5083 709/226 |
| 7,089,558 B2 * | 8/2006 | Baskey | ................. | G06F 9/5077 709/215 |
| 7,496,915 B2 | 2/2009 | Armstrong et al. | | |
| 7,506,325 B2 * | 3/2009 | Brokenshire | ........... | G06F 9/322 710/22 |
| 7,840,966 B2 * | 11/2010 | Dodge | .................. | G06F 9/4881 718/102 |
| 7,870,554 B2 * | 1/2011 | Dodge | .................. | G06F 9/4881 718/102 |
| 8,010,763 B2 * | 8/2011 | Armstrong | .......... | G06F 12/1475 711/153 |
| 8,032,871 B2 * | 10/2011 | Brokenshire | ........... | G06F 9/322 717/140 |
| 8,046,761 B2 * | 10/2011 | Howson | ................ | G06F 9/3824 712/225 |

(Continued)

FOREIGN PATENT DOCUMENTS

EP          1 555 610 A1    7/2005
JP       2004-326749 A    11/2004

OTHER PUBLICATIONS

'Hardware Threads vs Software Threads' by Mohd Rafi, Oct. 25, 2012.*

(Continued)

*Primary Examiner* — Steven Snyder
(74) *Attorney, Agent, or Firm* — McGinn IP Law Group, PLLC

(57) ABSTRACT

A semiconductor device includes an execution unit that executes an arithmetic instruction, and a scheduler including multiple first setting registers each defining a correspondence relationship between hardware threads and partitions, and which generates a thread select signal on the basis of a partition schedule and a thread schedule. The scheduler outputs a thread select signal designating a specific hardware thread, without depending on the thread schedule as the partition indicated by a first occupation control signal, according to a first occupation control signal output when the execution unit executes a first occupation start instruction.

12 Claims, 11 Drawing Sheets

(56) References Cited

U.S. PATENT DOCUMENTS

| | | | | |
|---|---|---|---|---|
| 8,145,884 B2* | 3/2012 | Kissell | G06F 8/4442 | 712/215 |
| 8,176,487 B2* | 5/2012 | Armstrong | G06F 12/1475 | 718/1 |
| 8,219,988 B2* | 7/2012 | Armstrong | G06F 12/1475 | 711/170 |
| 8,219,989 B2* | 7/2012 | Armstrong | G06F 12/1475 | 711/170 |
| 8,245,230 B2* | 8/2012 | Danko | G06F 9/4881 | 718/102 |
| 8,365,179 B2* | 1/2013 | Adachi | G06F 9/3851 | 718/103 |
| 8,407,387 B2* | 3/2013 | Adachi | G06F 13/24 | 710/264 |
| 8,434,086 B2* | 4/2013 | Dodge | G06F 9/4881 | 709/226 |
| 8,495,632 B2* | 7/2013 | Armstrong | G06F 12/1475 | 711/170 |
| 8,539,203 B2* | 9/2013 | Adachi | G06F 9/3836 | 712/214 |
| 8,544,013 B2* | 9/2013 | Dodge | G06F 9/4881 | 718/102 |
| 8,595,733 B2* | 11/2013 | Dodge | G06F 9/4881 | 718/102 |
| 8,607,030 B2* | 12/2013 | Adachi | G06F 9/3851 | 712/214 |
| 8,631,409 B2* | 1/2014 | Danko | G06F 9/4881 | 718/102 |
| 8,645,974 B2* | 2/2014 | Armstrong | G06F 12/1475 | 718/1 |
| 8,695,004 B2* | 4/2014 | Kaiser | | 718/103 |
| 8,766,996 B2* | 7/2014 | Du | G06F 9/3012 | 345/530 |
| 8,869,153 B2* | 10/2014 | Krieger | G06F 9/3851 | 718/102 |
| 9,081,621 B2* | 7/2015 | Fahrig | G06F 9/5077 | |
| 9,086,922 B2* | 7/2015 | Fahrig | G06F 9/5038 | |
| 9,098,336 B2* | 8/2015 | Adachi | G06F 9/3851 | |
| 9,158,692 B2* | 10/2015 | Auernhammer | G06F 12/0831 | |
| 9,286,091 B2* | 3/2016 | Adachi | G06F 9/45533 | |
| 2002/0129172 A1* | 9/2002 | Baskey | G06F 9/544 | 719/310 |
| 2002/0129274 A1* | 9/2002 | Baskey | G06F 9/544 | 726/1 |
| 2004/0215939 A1 | 10/2004 | Armstrong et al. | | |
| 2004/0215945 A1 | 10/2004 | Burky et al. | | |
| 2006/0095901 A1* | 5/2006 | Brokenshire | G06F 9/322 | 717/151 |
| 2006/0206881 A1* | 9/2006 | Dodge | G06F 9/4881 | 717/140 |
| 2007/0061788 A1* | 3/2007 | Dodge | G06F 9/4881 | 717/140 |
| 2007/0061809 A1* | 3/2007 | Dodge | G06F 9/4881 | 718/103 |
| 2007/0101013 A1* | 5/2007 | Howson | G06F 9/3824 | 709/231 |
| 2007/0143582 A1 | 6/2007 | Coon et al. | | |
| 2007/0226739 A1* | 9/2007 | Dodge | G06F 9/4881 | 718/102 |
| 2008/0022283 A1* | 1/2008 | Krieger | G06F 9/3851 | 718/104 |
| 2008/0196031 A1* | 8/2008 | Danko | G06F 9/4881 | 718/102 |
| 2008/0229321 A1* | 9/2008 | Krieger | G06F 9/3851 | 718/104 |
| 2008/0235701 A1* | 9/2008 | Danko | G06F 9/4881 | 718/104 |
| 2009/0007100 A1* | 1/2009 | Field | G06F 21/53 | 718/1 |
| 2009/0037682 A1* | 2/2009 | Armstrong | G06F 12/1475 | 711/164 |
| 2009/0037906 A1* | 2/2009 | Armstrong | G06F 12/1475 | 718/1 |
| 2009/0037907 A1* | 2/2009 | Armstrong | G06F 12/1475 | 718/1 |
| 2009/0037908 A1* | 2/2009 | Armstrong | G06F 12/1475 | 718/1 |
| 2009/0037941 A1* | 2/2009 | Armstrong | G06F 12/1475 | 719/328 |
| 2009/0138689 A1* | 5/2009 | Brokenshire | G06F 9/3851 | 712/234 |
| 2009/0144737 A1 | 6/2009 | Armstrong et al. | | |
| 2009/0210879 A1* | 8/2009 | Kaiser | G06F 9/4881 | 718/103 |
| 2010/0115243 A1* | 5/2010 | Kissell | G06F 8/4442 | 712/220 |
| 2011/0099551 A1* | 4/2011 | Fahrig | G06F 9/5038 | 718/102 |
| 2011/0107342 A1* | 5/2011 | Dodge | G06F 9/4881 | 718/103 |
| 2011/0276784 A1 | 11/2011 | Gewirtz et al. | | |
| 2012/0117353 A1* | 5/2012 | Armstrong | G06F 12/1475 | 711/173 |
| 2012/0210044 A1* | 8/2012 | Armstrong | G06F 12/1475 | 711/6 |
| 2013/0205058 A1* | 8/2013 | Adachi | G06F 13/26 | 710/264 |
| 2013/0247066 A1* | 9/2013 | Dodge | G06F 9/4881 | 718/104 |
| 2013/0263129 A1* | 10/2013 | Adachi | G06F 9/45533 | 718/1 |
| 2013/0297901 A1* | 11/2013 | Nakada | G06F 12/1416 | 711/163 |
| 2013/0332717 A1* | 12/2013 | Adachi | G06F 9/3836 | 712/244 |
| 2014/0089938 A1* | 3/2014 | Adachi | G06F 9/3851 | 718/107 |
| 2014/0109098 A1* | 4/2014 | Sato | G06F 9/4887 | 718/102 |
| 2014/0281442 A1* | 9/2014 | O'Sullivan | G06F 9/3851 | 712/245 |
| 2014/0282607 A1* | 9/2014 | O'Sullivan | G06F 9/3851 | 718/108 |
| 2015/0178088 A1* | 6/2015 | Gupta | G06F 9/30101 | 712/214 |
| 2015/0178131 A1* | 6/2015 | Gupta | G06F 9/30101 | 718/102 |
| 2015/0317179 A1* | 11/2015 | Fahrig | G06F 9/5077 | 718/1 |
| 2015/0324231 A1* | 11/2015 | Fahrig | G06F 9/5038 | 718/103 |

OTHER PUBLICATIONS

'Denali: Lightweight Virtual Machines for Distributed and Networked Applications' by Andrew Whitaker et al., 2002.*
European Search Report dated May 16, 2014, EP 13163470.

* cited by examiner

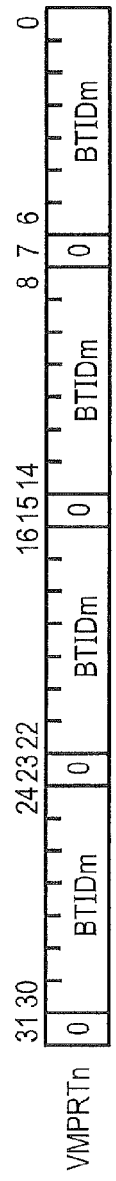

FIG. 4

| REGISTER | BITS 30-24 | | BITS 22-16 | | BITS 14-8 | | BITS 6-0 |
|---|---|---|---|---|---|---|---|
| | m | MEANING | m | MEANING | m | MEANING | m | MEANING |
| VMPRT0 | 3 | (UPPER LIMIT OF PRT2) + 1 LOWER LIMIT OF PRT3 | 2 | (UPPER LIMIT OF PRT1) + 1 LOWER LIMIT OF PRT2 | 1 | (UPPER LIMIT OF PRT0) + 1 LOWER LIMIT OF PRT1 | 0 | LOWER LIMIT OF PRT0 |

FIG. 5

VMPRT0: bits 31 30 | 24 23 22 | 16 15 14 | 8 7 6 | 0
- bit 31: 0
- bits 30-24: 0 (BTID3)
- bit 23: 0
- bits 22-16: 0 (BTID2)
- bit 15: 0
- bits 14-8: HT2 (BTID1)
- bit 7: 0
- bits 6-0: HT0 (BTID0)

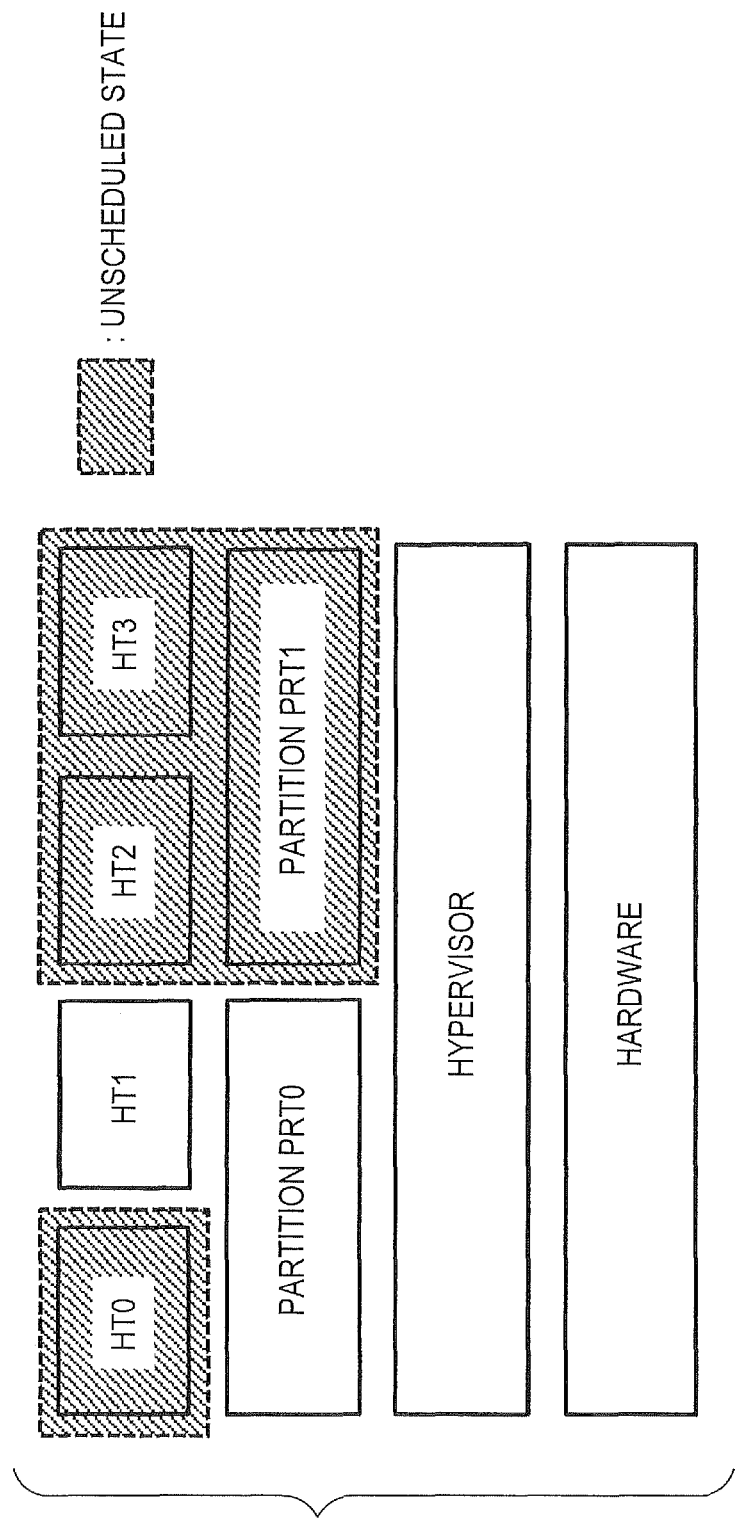

THREAD SCHEDULING IN A SYSTEM WITH MULTIPLE VIRTUAL MACHINES

CROSS-REFERENCE TO RELATED APPLICATIONS

The disclosure of Japanese Patent Application No. 2012-104577 filed on May 1, 2012 including the specification, drawings, and abstract is incorporated herein by reference in its entirety.

BACKGROUND

The present invention relates to a semiconductor device, and more particularly to a semiconductor device having a multi-thread processor that executes multiple threads at the same time.

In recent years, in order to improve the processing capacity of a processor, a multi-thread processor has been proposed. The multi-thread processor has threads each issuing an independent instruction flow. The multi-thread processor executes arithmetic processing while switching by which thread the instruction flow issued should be processed by an arithmetic circuit that processes an instruction by pipeline processing. In this situation, the multi-thread processor can process an instruction issued by another thread in another execution stage while executing an instruction issued by one thread in one execution stage in a pipeline. That is, in the arithmetic circuit of the multi-thread processor, the instructions independent of each other are executed in the respective different stages. As a result, the multi-thread processor reduces a time during which no instruction is processed in the execution stage in the pipeline while smoothly processing the respective instruction flows, and improves the processing capacity of the processor.

Also, the multi-thread processor of this type conducts the processing of temporarily enhancing the processing capacity on a given thread by stopping a part of the plural threads to be executed In this way, the technique of dynamically switching the number of threads to be executed is disclosed in Japanese Unexamined Patent Application Publication No. 2004-326749.

Also, there is a virtualization technique of making a single physical resource (hardware resource) look like multiple resources. With the use of this virtualization technique, for example, multiple virtual machines (VM: virtual machine) can be operated on one CPU as a result of which different operating systems (OS: operating systems) can be operated on the respective virtual machines. The multiple virtual machines which are operated, can be represented by a physical CPU or memory, being virtualized to generate a logical partition by another expression. In the present specification, the expression "partition" is used as the same meaning as that of the virtual machine.

Japanese Unexamined Patent Application Publication No. 2004-326749 discloses a device for controlling the multi-thread processor in a computer that is logically partitioned. The logically partitioned computer includes multiple partitions, and a partition manager that controls the multiple partitions. Also, in the multi-thread processor disclosed in Japanese Unexamined Patent Application Publication No. 2004-326749, a first hardware thread among multiple hardware threads is assigned to a logical processor which is present in a first partition among the multiple partitions. Further, the device disclosed in Japanese Unexamined Patent Application Publication No. 2004-326749 includes a control circuit which is configured to selectively activate and inactivate the first hardware thread among the multiple hardware which is executed by the multi-thread processor, and also configured to control a method of activating the first hardware thread once the first hardware thread is inactivated. The partition manager of the device disclosed in Japanese Unexamined Patent Application Publication No. 2004-326749 instructs the control circuit to regard a logical processor as off-line in the first partition, to thereby prohibit the reactivation of the first hardware thread responsive to an expression of interrupt, and inactivate the hardware thread.

With the above configuration, the device disclosed in Japanese Unexamined Patent Application Publication No. 2004-326749 inactivate the first hardware thread among the multiple hardware threads, and improves the processing capacity of other hardware threads.

SUMMARY

However, in the technique disclosed in Japanese Unexamined Patent Application Publication No. 2004-326749, the first hardware thread cannot be inactivated without the interposition of the partition manager. Thus, processing conducted to stop partial activation of the hardware thread becomes an overhead in the processing of the processor. For that reason, the technique disclosed in Japanese Unexamined Patent Application Publication No. 2004-326749 suffers from a problem that the processing capacity of the processor is impaired by the overhead.

According to one aspect of the present invention, there is provided a semiconductor device including: multiple hardware threads that each issues an independent instruction flow; an execution unit that executes an arithmetic instruction belonging to the instruction flow issued by any one of the multiple hardware threads; and a scheduler that includes multiple first setting registers provided in correspondence with multiple partitions and which define a correspondence relationship between the hardware threads and the partitions, and generates a thread select signal on the basis of a partition schedule defining a rate of execution times of the respective partitions, and a thread schedule defining a rate of execution times of the respective hardware threads within the execution time assigned to each of the partitions, in which the scheduler outputs the thread select signal designating the hardware thread, indicated by a first occupation control signal without depending on the thread schedule, as the hardware thread selected during the execution time assigned to the partition, which is indicated by the first occupation control signal, according to the first occupation control signal output by the execution unit when the arithmetic instruction executed in the execution unit is a first occupation start instruction for occupying the execution time assigned to any one of the partitions.

Also, according to another aspect of the present invention, there is provided a semiconductor device that assigns multiple hardware threads each issuing an independent instruction flow to any one of multiple partitions each logically defined, and executes the hardware threads, the semiconductor device including: an execution unit that executes an arithmetic instruction belonging to the instruction flow issued by the hardware thread selected from the multiple hardware threads according to a thread select signal; and a scheduler that includes first setting schedulers provided in correspondence with the multiple partitions and each storing a thread schedule defining a correspondence relationship related to assignment of execution time of the hardware thread within the corresponding partition therein, and generates the thread select signal on the basis of the thread schedule, in which the scheduler further includes a first control register, and outputs the thread select signal designating a specific hardware thread without depending on the thread schedule when the first control register is set to a setting value indicating that one partition is in an occupied state.

In the semiconductor device according to the aspects of the present invention, the scheduler outputs the thread select signal designating the hardware thread fixed in a period when one partition is selected according to the first occupation start instruction executed in the execution unit. As a result, the semiconductor device according to the present invention can switch a state from the unoccupied state to the occupied state for each of the partitions without interposition of a host system such as the OS or the partition manager.

According to the semiconductor device of the present invention, an overhead when switching the state from the unoccupied state to the occupied state for each of the partitions can be eliminated to improve the processing capacity.

BRIEF DESCRIPTION OF THE DRAWINGS

FIG. 2 is a diagram illustrating a configuration example of a register configuring a thread assignment table according to the first embodiment;

FIG. 3 is a table illustrating a definition of fields of the register illustrated in FIG. 2;

FIG. 4 is a diagram illustrating the meaning of the respective fields in a dispatch unit in the semiconductor device according to the first embodiment;

FIG. 5 is a diagram illustrating an example of a thread assignment table for defining the partitions illustrated in FIG. 1;

FIG. 14 is a diagram illustrating the software hierarchy in the HT1 occupied period of the timing chart illustrated in FIG. 13.

DETAILED DESCRIPTION

First Embodiment

Figure 1:
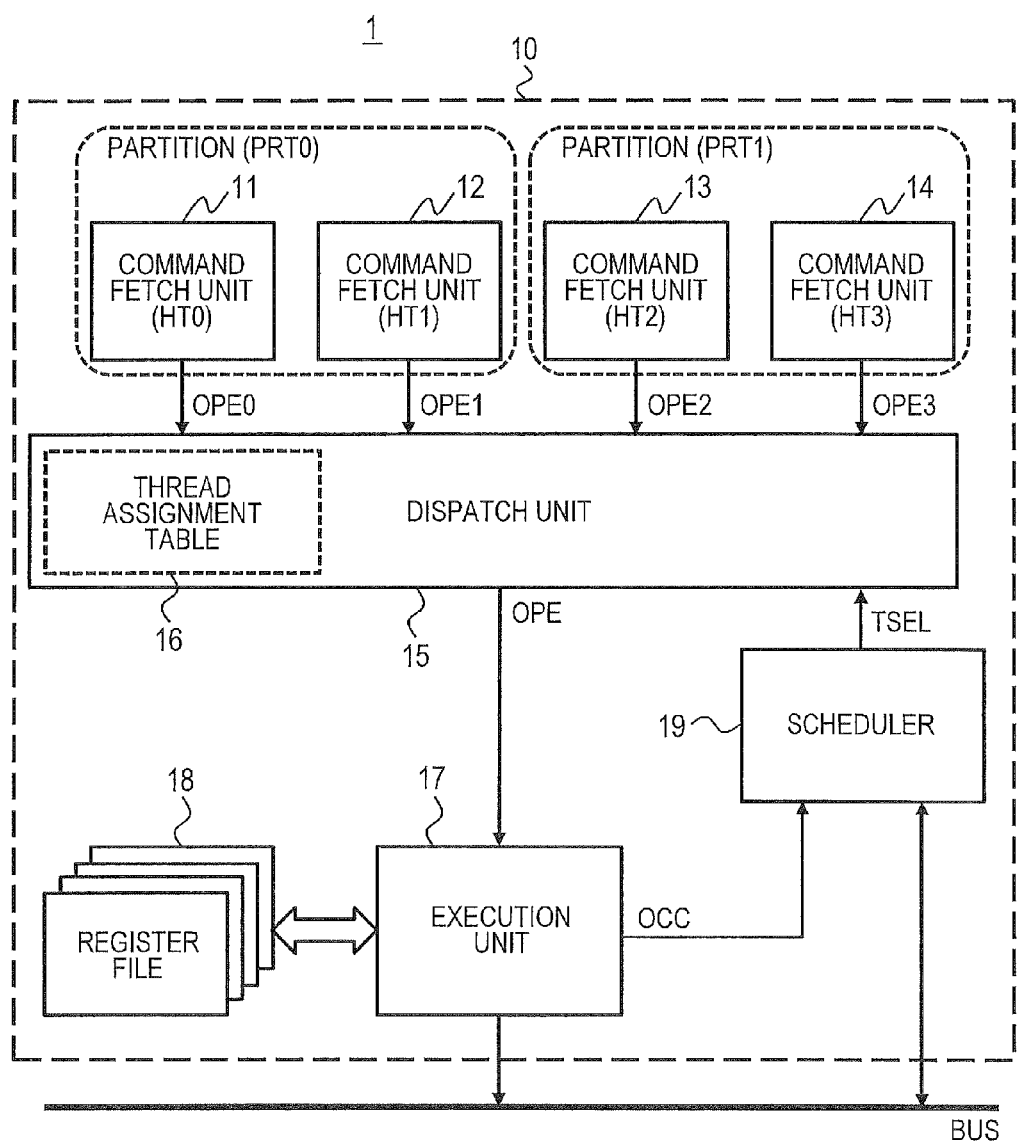
FIG. 1 is a block diagram of a semiconductor device according to a first embodiment.

An embodiment of the present invention will be described below with reference to the accompanying drawings. First, a block diagram of a semiconductor device according to a first embodiment is illustrated in FIG. 1. The present invention relates to the semiconductor device, particularly, processing of a CPU incorporated into the semiconductor device. For that reason, in the block diagram illustrated in FIG. 1, a CPU 10 is provided in a semiconductor device 1. The semiconductor device 1 includes the CPU 10 illustrated in FIG. 1 as well as other circuit blocks such as a memory and a timer. In the semiconductor device 1, the CPU 10 is connected to the other circuit blocks through a bus within the semiconductor device.

As illustrated in FIG. 1, the CPU 10 includes instruction fetch units 11 to 14, a dispatch unit 15, an execution unit 17, a register file 18, and a scheduler 19. Also, in the example illustrated in FIG. 1, partitions logically defined are also illustrated. As a specific example, in FIG. 1, a hardware thread HT0 and a hardware thread HT1 are assigned to a first partition (for example, partition PRT0), and a hardware thread HT2 and a hardware thread HT2 are assigned to a second partition (for example, partition PRT1). In FIG. 1, in order to clarify the above assignment, the instruction fetch units 11 to 14 are boxed to differentiate the partitions. The boxes indicate the logical assignment of the partitions, and the instruction fetch units 11 to 14 each have an independent hardware configuration.

The instruction fetch units 11 to 14 each have an independent program counter, and issue an independent instruction flow. The CPU 10 configures a hardware thread with the aid of the instruction fetch units 11 to 14. In FIG. 1, an arithmetic instruction belonging to the instruction flow issued by the instruction fetch unit 11 is indicated by OPE0, an arithmetic instruction belonging to the instruction flow issued by the instruction fetch unit 12 is indicated by OPE1, an arithmetic instruction belonging to the instruction flow issued by the instruction fetch unit 13 is indicated by OPE2, and an arithmetic instruction belonging to the instruction flow issued by the instruction fetch unit 14 is indicated by OPE3. Also, in the first embodiment, hardware thread No. for identifying the hardware thread configured by the instruction fetch unit 11 is indicated by HT0, hardware thread No. for identifying the hardware thread configured by the instruction fetch unit 12 is indicated by HT1, hardware thread No. for identifying the hardware thread configured by the instruction fetch unit 13 is indicated by HT2, and hardware thread No. for identifying the hardware thread configured by the instruction fetch unit 14 is indicated by HT3.

Also, in FIG. 1, although not shown, the instruction fetch units 11 to 14 each read an instruction code from a memory not shown through a bus BUS. The instruction fetch units 11 to 14 each decode the read instruction code to issue the arithmetic instruction.

The dispatch unit 15 includes a thread assignment table 16. The thread assignment table 16 may be arranged outside of the dispatch unit 15. For example, the thread assignment table 16 can be arranged in an internal memory or a scheduler of the semiconductor device 1.

The dispatch unit 15 selects one of the arithmetic instructions issued by the multiple hardware threads according to a thread select signal TSEL. More specifically, the dispatch unit 15 selects the hardware thread that gives the execution unit 17 the arithmetic instruction according to the thread select signal TSEL indicative of the hardware thread for issuing the arithmetic instruction which is executed by the execution unit 17 in a subsequent processing cycle. The thread select signal TSEL includes a hardware thread No. for issuing the arithmetic instruction which is executed by the execution unit 17 in the subsequent processing cycle, and a partition No. corresponding to the partition to which the hardware thread corresponding to the hardware thread HT NO. belongs.

The dispatch unit 15 determines whether the combination of the thread select signal TSEL with the partition No. matches a combination defined in the thread assignment table 16. Then, if the determination result indicates mismatch, the dispatch unit 15 stops the issuance of the arithmetic instruction to the execution unit 17.

The dispatch unit 15 verifies the validity of the combination of the partition No. of the thread select signal TSEL with the hardware thread No. to execute the assignment of the hardware thread HT to the partition. Also, with the execution of the verification, an independence between the respective partitions can be ensured without limiting write by the scheduler 19 into the register.

The thread assignment table 16 is a register including information indicative of a correspondence relationship between the partitions and the hardware threads. The semiconductor device 1 reads a setting value indicative of the correspondence relationship between the partitions and the hardware threads from a nonvolatile storage device (not shown), and stores the setting value in the thread assignment table 16. Also, the semiconductor device 1 writes the setting of the thread schedule in a first setting register disposed in the scheduler 19 on the basis of the thread assignment table 16. The details of the register will be described later.

The execution unit 17 executes the arithmetic instruction belonging to the instruction flow generated by any one of the HT0 to HT3. In the example illustrated in FIG. 1, the dispatch unit 15 selects the arithmetic instruction belonging to the instruction flow generated by any one of HT0 to HT3, and gives the arithmetic instruction OPE to the execution unit 17. That is, in the example illustrated in FIG. 1, the execution unit 17 executes the arithmetic instruction OPE selected by the dispatch unit 15. Then, the execution unit 17 conducts calculation on data stored in the register file 18 according to the arithmetic instruction OPE. The register file 18 has storage areas independent for the respective hardware threads. If the arithmetic instruction OPE is an instruction for requesting an external access such as a load instruction or a store instruction, the execution unit 17 accesses to a peripheral circuit such as a memory not shown through the bus BUS.

Also, if the arithmetic instruction OPE is an instruction for changing an occupied state of the execution time by any hardware thread, the execution unit 17 outputs an occupation control signal OCC. For example, if the arithmetic instruction OPE is a first occupation start instruction for occupying the execution time assigned to any one partition, the execution unit 17 outputs a first occupation control signal as the occupation control signal OCC. The first occupation control signal includes a partition No. which is an occupation target of the execution time, and an occupation hardware thread No. that occupies the execution time. When the arithmetic instruction OPE is a first occupation cancel instruction for canceling the occupied state of the execution time which is assigned to any one partition, the execution unit 17 outputs the second occupation control signal as the occupation control signal OCC. If the arithmetic instruction OPE is a second occupation start instruction for allowing one hardware thread to occupy all of the execution time of the execution unit 17, the execution unit 17 outputs a third occupation control signal as the occupation control signal OCC. If the arithmetic instruction OPE is a second occupation start instruction for allowing one hardware thread to occupy all of the execution time of the execution unit, the execution unit 17 outputs a third occupation control signal as the occupation control signal OCC. If the arithmetic instruction OPE is a second occupation cancel instruction for canceling a state in which one hardware thread occupies all of the execution time of the execution unit, the execution unit 17 outputs a fourth occupation control signal as the occupation control signal OCC. In the following description, a code of OCC is used for the first occupation control signal to the fourth occupation control signal.

The scheduler 19 is provided to correspond to the multiple partitions, and includes at least multiple first setting registers which define a correspondence relationship between the hardware threads and the partitions. The scheduler 19 generates the thread select signal TSEL on the basis of a partition schedule that defines a rate of the execution time between the respective partitions, and a thread schedule that defines a rate of the execution time of the hardware thread within the execution time assigned to each of the partitions. Also, the scheduler 19 outputs the thread select signal TSEL so that the execution time assigned to one partition or all of the execution time of the execution unit 17 is occupied by one hardware thread on the basis of the occupation control signal OCC.

More specifically, the scheduler 19 outputs the thread select signal TSEL for designating the hardware thread indicated by the first occupation control signal, without depending on the thread schedule, as the hardware thread selected during the execution time assigned to the partition indicated by the first occupation control signal. Thus, this thread select signal is output during the execution time assigned to the partition. The hardware thread selected during the execution time assigned to the partition indicated by the first occupation control signal, according to the first occupation control signal output by the execution unit 17 when the arithmetic instruction OPE executed by the execution unit 17 is the first occupation start instruction for occupying the execution time assigned to any one partition. Also, the scheduler 19 outputs the thread select signal TSEL for designating the hardware thread determined on the basis of the thread schedule, according to the second occupation control signal output by the execution unit 17 when the arithmetic instruction OPE executed in the execution unit 17 is the first occupation cancel instruction for canceling the occupied state of the execution time assigned to any one partition.

The scheduler 19 outputs the thread select signal TSEL including a second occupation hardware thread No. corresponding to the hardware thread indicated by the third occupation control signal without depending on the thread schedule and the partition schedule, according to the third occupation control signal output by the execution unit 17 when the arithmetic instruction OPE executed by the execution unit 17 is the second occupation start instruction for allowing one hardware thread occupies all of the execution time of the execution unit 17. Also, the scheduler 19 outputs the thread select signal TSEL determined on the basis of the thread schedule and the partition schedule, according to the fourth occupation control signal output by the execution unit when the arithmetic instruction OPE executed in the execution unit 17 is the second occupation cancel instruction for canceling a state in which one hardware thread occupies all of the execution time of the execution unit 17.

Subsequently, the details of the thread assignment table will be described. FIG. 2 illustrates a configuration example of the register configuring the thread assignment table. As illustrated in FIG. 2, the thread assignment table has a partition setting register VMPRTn for defining the hardware thread belonging to the partition. The partition setting register VMPRTn illustrated in FIG. 2 has a data length of 32 bits. Also, n is a value indicative of No. of the partition setting register. The number of partition setting register VMPRTn is determined according to the number of partitions defined by the semiconductor device 1 in the first embodiment. For example, when the partition setting register illustrated in FIG. 2 is used, four fields at the maximum can be set by one register, and the number of fields required for setting is a number obtained by adding 1 to the number of partitions. Therefore, if the number of partitions is eight, three partition setting registers are required.

The partition setting register VMPRTn is divided into multiple fields. Which value is stored for each of the fields is determined according to the specification. A table indicating the definition of the fields of the partition setting register is illustrated in FIG. 3. As illustrated in FIG. 3, in the partition setting register VMPRTn according to the first embodiment, 0 is set in the fields of a $31^{st}$ bit, a $23^{rd}$ bit, a $15^{th}$ bit, and a $7^{th}$ bit as reserved areas. Also, read only attributes are set in the fields set as the reserved areas. In the partition setting register VMPRTn according to the first embodiment, areas in which the base thread ID is stored are set in four fields including a field from a $30^{th}$ bit to a $24^{th}$ bit, a field from a $22^{nd}$ bit to a $16^{th}$ bit, a field from a $14^{th}$ bit to an $8^{th}$ bit, and a field from a $6^{th}$ bit to a $0^{th}$ bit. The base thread ID indicates a lower limit value of the hardware thread HTm (m is a value indicative of No. of the hardware thread) assigned to the partition. Also, a write enable attribute and a read enable attribute are given the fields in which the base thread ID is stored.

Also, a diagram illustrating the meanings of the respective fields in the dispatch unit 15 of the semiconductor device 1 according to the first embodiment is illustrated in FIG. 4. As illustrated in FIG. 4, the dispatch unit 15 recognizes a range of the hardware thread belonging to the first partition on the basis of the base thread ID of the first partition and the base thread ID of the second partition logically adjacent to the first partition. More specifically, the dispatch unit 15 recognizes a lower limit value of the hardware thread assigned to the partition PRT0 according to the base thread ID stored in the field from the $6^{th}$ bit to the $0^{th}$ bit, and recognizes an upper limit value of the hardware thread assigned to the partition PRT0 according to a value obtained by subtracting 1 from the base thread ID stored in the field from the $14^{th}$ bit to the $8^{th}$ bit.

FIG. 5 illustrates an example of the thread assignment table for defining the partitions illustrated in FIG. 1. As illustrated in FIG. 5, in order to set the partition illustrated in FIG. 1, HT0 is stored as the base thread ID in the field from the $6^{th}$ bit to the $0^{th}$ bit of the partition setting register VMPRTn, HT2 is stored as the base thread ID in the field from the $14^{th}$ bit to the $8^{th}$ bit, and a default (for example, 0) is stored in the field from the $22^{nd}$ bit to the $16^{th}$ bit and the field from the $30^{th}$ bit to the $24^{th}$ bit. With this setting, the dispatch unit 15 recognizes that the hardware threads HT0 and HT1 are assigned to the partition PRT0, and the hardware threads HT2 and HT3 are assigned to the partition PRT1.

The thread assignment table 16 is configured by the register described with reference to FIGS. 2 to 4 so that the partitions can be flexibly set without conducting a complicated calculation in the dispatch unit 15. An input of the base thread ID to the thread assignment table 16 is conducted as one processing of initializing operation conducted when the CPU 10 starts. Also, although a connection wiring between the thread assignment table 16 and the bus BUS is omitted in FIG. 1, write processing in the thread assignment table 16 is conducted by the execution unit 17 through the bus BUS. The bus BUS is disposed inside of the semiconductor device.

Figure 6:
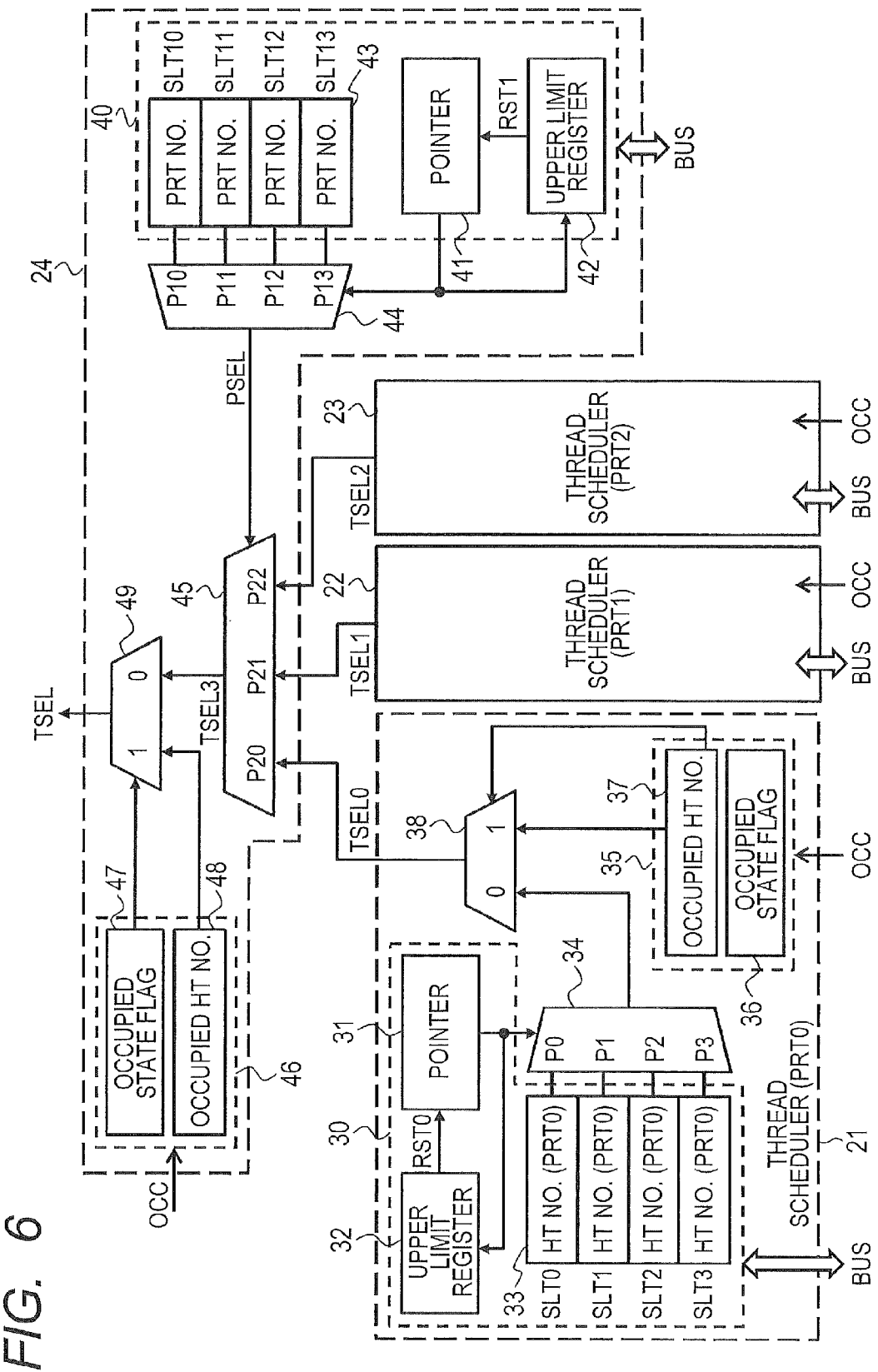
FIG. 6 is a block diagram of a scheduler according to the first embodiment.

Subsequently, the details of the scheduler 19 will be described. The detailed block diagram of the scheduler 19 is illustrated in FIG. 6. As illustrated in FIG. 6, the scheduler has multiple thread schedulers (for example, thread schedulers 21 to 23), and a partition scheduler 24. The scheduler 19 illustrated in FIG. 6 corresponds to three partitions, and therefore has three thread schedulers. It is preferable that the number of thread schedulers is determined according to the maximum number of partitions determined in the specification.

The thread schedulers 21 to 23 are each made to correspond to any one of the multiple partitions, and output the thread select signal TSEL0 to TSEL2 including the hardware thread No. for identifying the hardware thread belonging to the corresponding partition. The thread schedulers 21 to 23 have the same circuit configuration. Therefore, in this example, the thread scheduler 21 will be described in detail, and the detailed description of the thread schedulers 22 and 23 will be omitted.

The thread scheduler 21 includes a thread schedule table 30, a first selector (for example, selector 34), a partition occupation state control register 35, and a second selector (for example, selector 38).

The thread schedule table 30 defines the thread schedule. The thread schedule table 30 includes a pointer 31, an upper limit register 32, and a first setting register (for example, thread schedule setting register 33). The pointer 31 generates a slot designation value that is incremented by one every time the thread scheduler 21 generates the thread select signal TSEL0 including the hardware thread No. The upper limit register 32 has an upper limit value of the slot designation value, and resets the pointer 31 upon arrival of the slot designation value at the upper limit value. The thread schedule setting register 33 is one of the multiple first setting registers, and the subject thread scheduler stores the hardware thread No. of the hardware thread assigned to the corresponding partition therein, and defines the thread schedule. More specifically, the thread schedule setting register 33 has multiple slots (for example, slots SLT0 to SLT3). The hardware thread Nos. are given the multiple slots SLT0 to SLT3 through the bus BUS. Also, the partition No. corresponding to the corresponding partition of the thread scheduler 21 is stored together with the hardware thread No. in the thread schedule setting register 33.

The selector 34 selects any one of the hardware thread Nos. stored in the thread schedule setting register 33 on the basis of the thread schedule. More specifically, the selector 34 has ports P0 to P3 as input terminals. The ports P0 to P3 are provided to correspond to the slots SLT0 to SLT3 of the thread schedule setting register 33. The hardware thread Nos. stored in the slots SLT0 to SLT3 are given the ports P0 to P3. Also, a slot select signal for designating the port selected from the pointer 31 is given the selector 34. That is, the selector 34 cyclically sequentially selects the hardware thread Nos. stored in the slots SLT0 to SLT3.

The partition occupation state control register 35 has a first control register (for example, register 36) and a second control register (for example, register 37). The register 36 stores a first occupied state flag indicative of the valid state therein when the first occupation control signal OCC indicates a partition corresponding to the subject thread scheduler. The register 36 makes the first occupied state flag in the invalid state when receiving the second occupation control signal OCC generated when the arithmetic instruction executed by the execution unit 17 is the first occupation cancel instruction. That is, the first occupied state flag is a setting value indicating whether one partition is made in the occupied state or in the unoccupied state. The register 37 stores the first occupation hardware thread No. for identifying the hardware thread indicated by the first occupation control signal OCC therein.

The selector 38 outputs the hardware thread No. selected by the selector 34 as the thread select signal TSEL0 when the occupied state flag is in the invalid state (for example, 0), and outputs the first occupation hardware thread No. stored in the register 37 as the thread select signal TSEL0 when the occupied state flag is in the valid state (for example, 1).

The partition scheduler 24 selects the partition that generates the arithmetic instruction in the subsequent processing cycle. The partition scheduler 24 includes a partition schedule table 40, a third selector (for example, selector 44), a fourth selector (for example, selector 45), a CPU occupied state control register 46, and a fifth selector (for example, selector 49).

The partition schedule table 40 defines the partition schedule. The partition schedule table 40 includes a pointer 41, an upper limit register 42, and a second setting register (for example, partition schedule setting register 43). The pointer 41 generates a slot designation value that is incremented by one every time the partition scheduler 24 generates the thread select signal TSEL including the hardware thread No. The upper limit register 42 has an upper limit value of the slot designation value, and resets the pointer 41 upon arrival of the slot designation value at the upper limit value. The partition schedule setting register 43 is a register that defines the thread schedule. More specifically, the partition schedule setting register 43 includes multiple slots (for example, slots SLT10 to SLT13). The partition Nos. are given slots SLT10 to SLT13 through the bus BUS.

The selector 44 outputs the partition No. corresponding to the partition that issues the arithmetic instruction in the subsequent processing cycle on the basis of the partition schedule as a partition select signal PSEL. More specifically, the selector 44 has ports P10 to P13 as input terminals. The ports P10 to P13 are provided to correspond to the slots SLT10 to SLT13 of the partition schedule setting register 43. The partition Nos. stored in the slots SLT10 to SLT13 are given the ports P10 to P13. Also, the slot select signal for designating the port selected from the pointer 41 is given the selector 44. That is, the selector 44 cyclically sequentially selects the partition Nos. stored in the slots SLT10 to SLT13.

The selector 45 selects the thread select signal output by the thread scheduler corresponding to the partition No. selected by the selector 44. More specifically, the selector 45 has ports P20 to P22 as the input terminals. The ports P20 to P22 are provided to correspond to the thread schedulers 21 to 23. The thread select signals TSEL0 to TSEL2 output by the thread schedulers 21 to 23 are given the ports P20 to P22.

The CPU occupied state control register 46 has a third control register (for example, register 47) and a fourth control register (for example, register 48). The register 47 stores the second occupied state flag which becomes in the valid state according to the third occupation control signal therein. The register 47 makes the second occupied state flag in the invalid state when receiving the fourth occupation control signal OCC generated when the arithmetic instruction executed by the execution unit 17 is the second occupation cancel instruction. That is, the second occupied state flag is a setting value indicative of whether the CPU is made in the occupied state or the unoccupied state by the specific hardware thread. The register 48 stores the first occupied hardware thread No. for identifying the hardware thread indicated by the third occupation control signal OCC therein.

The selector 49 outputs the thread select signal TSEL selected by the selector 45 when the second occupied state flag is in the invalid state (for example, 0), and outputs the second occupation hardware thread No. stored in the register 48 as the thread select signal TSEL when the second occupied state flag is in the valid state (for example, 1).

Figure 7:
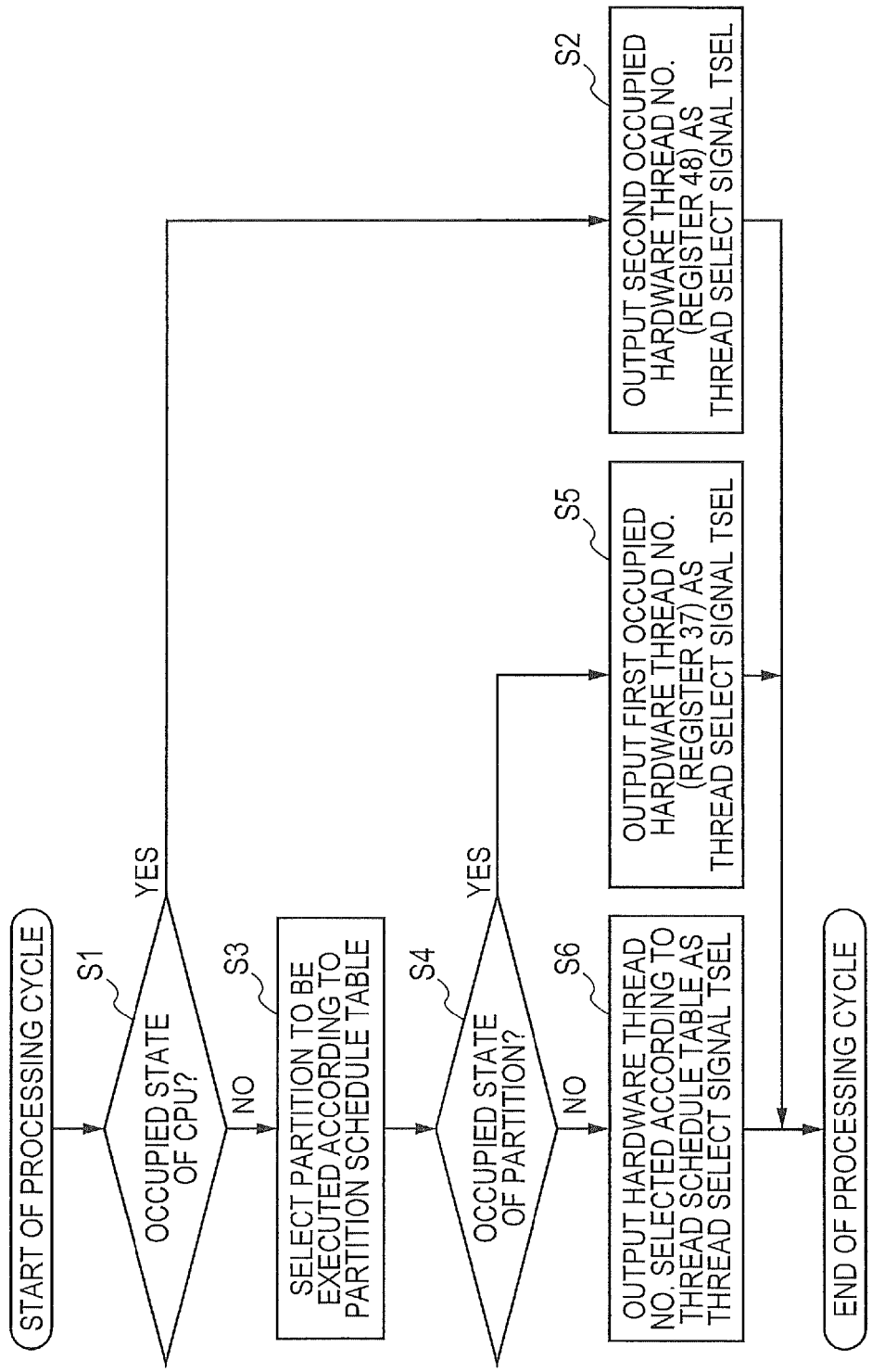
FIG. 7 is a flowchart illustrating the operation of the semiconductor device according to the first embodiment.

The operation of the scheduler 19 will be described. FIG. 7 illustrates the operation of the scheduler 19. The flowchart illustrated in FIG. 7 illustrates the operation of the scheduler 19 in one processing cycle. As illustrated in FIG. 7, when the processing cycle starts, the scheduler 19 first determines whether the CPU 10 is in the occupied state, or not, with reference to the second occupied state flag stored in the register 47 (Step S1). If it is determined that the CPU 10 is in the occupied state in Step S1, the second occupation hardware thread No. stored in the register 48 is selected as the thread select signal TSEL (Step S2).

On the other hand, if it is determined that the CPU 10 is in the unoccupied state in Step S1, the partition that issues the arithmetic instruction in the subsequent processing cycle is selected according to the partition schedule table (Step S3). Then, it is determined whether the selected partition is in the occupied state, or not, with reference to the first occupied state flag stored in the register 36 of the thread scheduler corresponding to the partition selected in Step S3 (Step S4).

Then, if it is determined that the partition selected in Step S4 is in the occupied state, the first occupation hardware thread No. stored in the register 37 is selected as the thread select signal TSEL (Step S5). On the other hand, if it is determined that the partition selected in Step S4 is in the unoccupied state, the hardware thread No. selected according to the partition schedule table 40 is output as the thread select signal TSEL (Step S6). Then, the processing of one processing cycle in the scheduler 19 is completed upon completion of the output of the thread select signal TSEL in Steps S2, S5, and S6.

Figure 8:
FIG. 8 is a diagram illustrating an example of a thread schedule and a partition schedule in the semiconductor device according to the first embodiment.

Subsequently, the operation of the semiconductor device 1 according to the first embodiment will be described. First, the partition schedule, the thread schedule of the partition PRT0, and the thread schedule of the partition PRT1 in the operation example of the semiconductor device 1 described below are illustrated in FIG. 8. As illustrated in FIG. 8, in the operation example described below, a rate of the execution time of the partition PRT0 and the execution time of the partition PRT1 is set to 2:1. In the partition PRT0, the rate of the execution time of the hardware thread HT0 and the execution time of the hardware thread HT1 is set to 1:1. In the partition PRT1, the rate of the execution time of the hardware thread HT2 and the execution time of the hardware thread HT3 is set to 1:1. That is, in the semiconductor device 1 that operates on the basis of the schedule illustrated in FIG. 8, the rate of the execution time of the hardware threads HT0 to HT3 are roughly 33:33:17:17.

Figure 9:
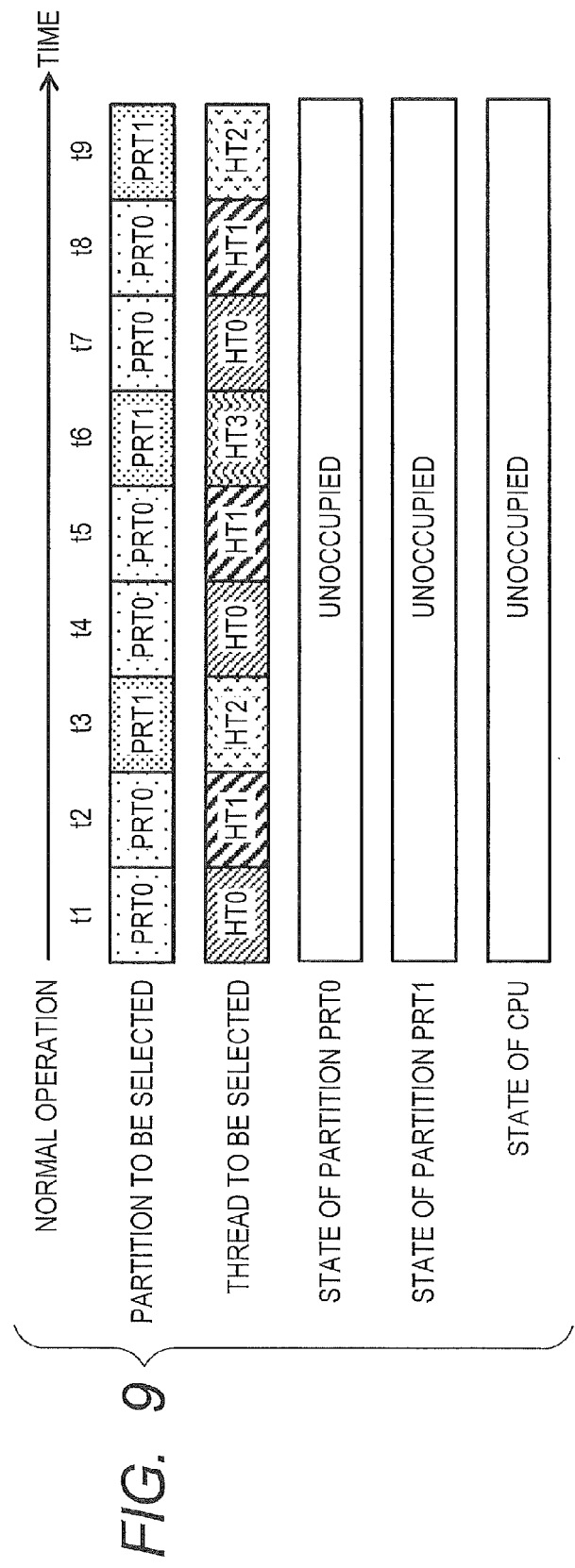
FIG. 9 is a timing chart illustrating normal operation of the semiconductor device according to the first embodiment

A timing chart when the semiconductor device 1 that operates on the basis of the schedule illustrated in FIG. 8 operates in a normal operation state (state in which all of the partitions and the CPU operate in the unoccupied state) is illustrated in FIG. 9. As illustrated in FIG. 9, in the normal operation, three processing cycles that the partition PRT1 is selected once after the partition PRT0 is selected twice) are repetitively conducted. Then, in a period where the partition PRT0 is selected, the hardware thread HT0 and the hardware thread HT1 are repetitively selected. In a period where the partition PRT1 is selected, the hardware thread HT2 and the hardware thread HT3 are repetitively selected. Also, in the operation example illustrated in FIG. 9, the unoccupied state of the partitions PRT0, PRT1, and the CPU is maintained in all of the period.

Figure 10:
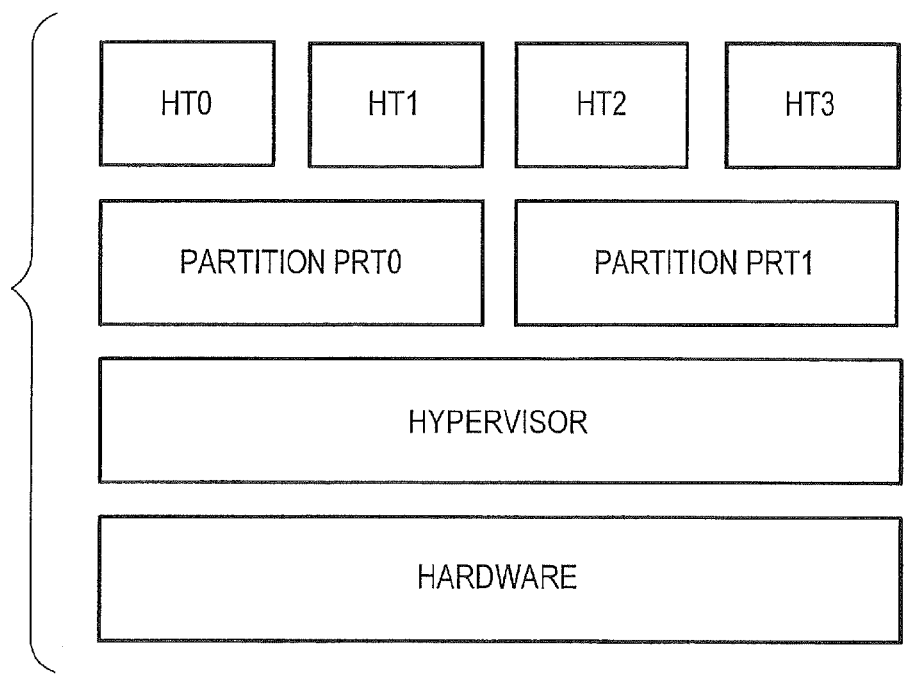
FIG. 10 is a diagram illustrating a software hierarchy of the semiconductor device that operates on the basis of the timing chart illustrated in FIG. 9.

A diagram illustrating a software hierarchy of the semiconductor device 1 that operates on the basis of the timing chart illustrated in FIG. 9 is illustrated in FIG. 10. As illustrated in FIG. 10, the semiconductor device 1 that operates in the timing chart illustrated in FIG. 9 operates a hypervisor program on a hardware such as the CPU 10. The hypervisor program is executed by using all of the execution time of the hardware. Also, the partitions PRT0 and PRT1 are executed on the hypervisor program. The rate of the execution time of the partitions PRT0 and PRT1 is determined according to the partition schedule. Also, the hardware threads HT0 and HT1 are executed on the partition PRT0. The rate of the execution time of the hardware threads HT0 and HT1 is determined according to the thread schedule corresponding to the partition PRT0. Also, the hardware threads HT2 and HT3 are executed on the partition PRT1. The Rate of the execution time of the hardware threads HT2 and HT3 is determined according to the thread schedule corresponding to the partition PRT1.

Figure 11:
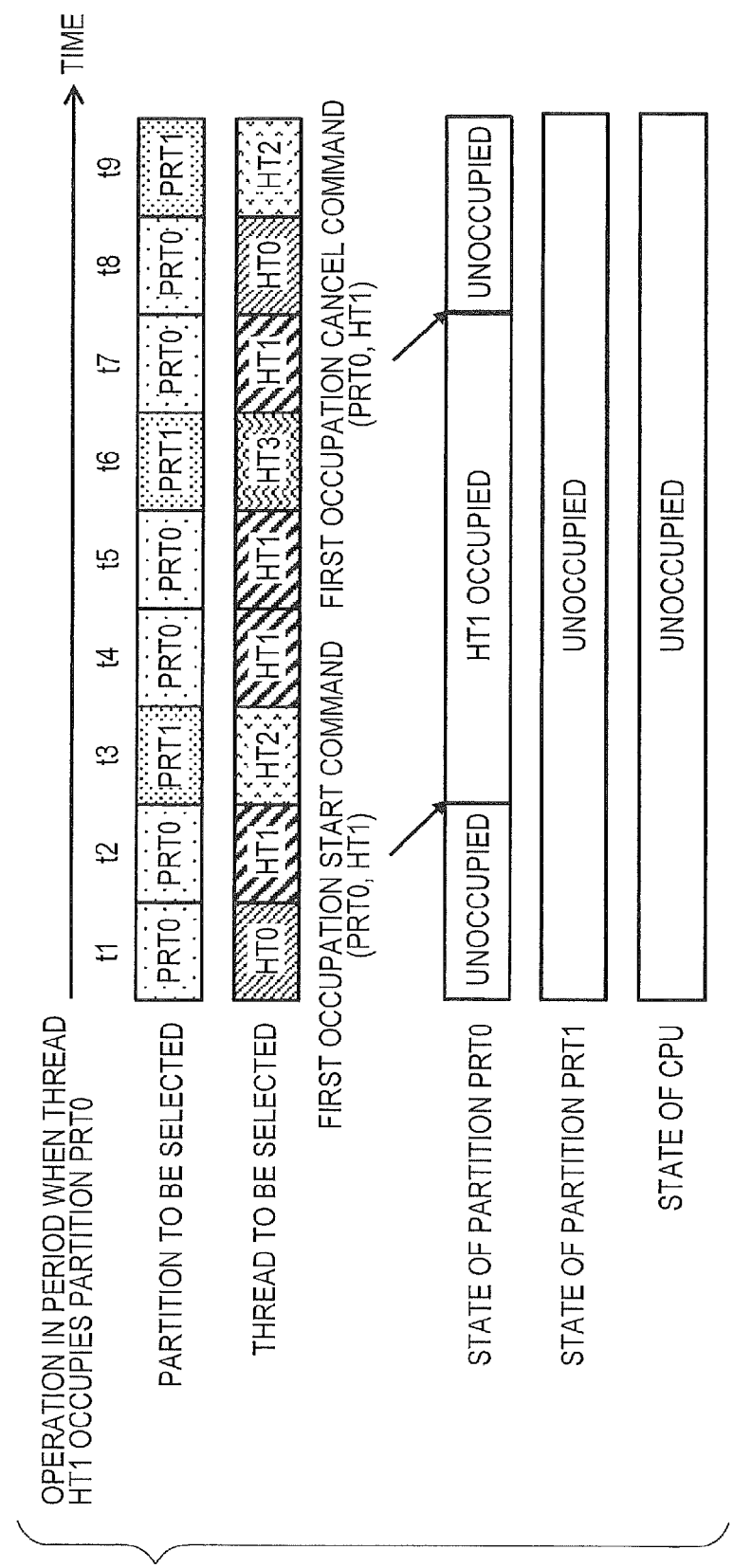
FIG. 11 is a timing chart illustrating the operation of the semiconductor device when there is a period where a thread occupying one partition is present according to the first embodiment.

A timing chart when the semiconductor device 1 that operates on the basis of the schedule illustrated in FIG. 8 operates in a period where the hardware thread HT1 occupies the partition PRT0 is illustrated in FIG. 11. As illustrated in FIG. 11, in the operation example, the hardware thread HT1 selected in a processing cycle t2 issues the first occupation start instruction for allowing the execution time assigned to the partition PRT0 to be occupied by the hardware thread HT1. Then, in response to the first occupation start instruction, the execution unit 17 outputs the occupation control signal OCC (for example, the first occupation control signal OCC) with the hardware thread HT1 of the partition PRT0 as the first occupation hardware thread No. In the thread scheduler 21 of the scheduler 19, the first occupied state flag of the register 36 is rewritten to the valid state according to the first occupation control signal OCC, and the hardware thread HT1 is stored in the register 37 as the first occupation hardware thread No.

Then, the partition PRT0 is occupied by the hardware thread HT1 from the processing cycle t3 upon rewriting values of the registers 36 and 37. As a result, in processing cycles t4 and t5 where the partition PRT0 is selected after the processing cycle t3, the hardware thread HT1 is selected. On the other hand, even after the processing cycle t3, in the period where the partition PRT1 is selected, the hardware threads HT2 and HT3 are repetitively selected.

Upon issuance of the first occupation cancel instruction by the hardware thread HT1 selected in a processing cycle t7, the execution unit 17 outputs the occupation control signal OCC (for example, the second occupation control signal OCC) for canceling the occupied state by the hardware thread HT1 of the partition PRT0. In the thread scheduler 21 of the scheduler 19, the first occupied state flag of the register 36 is rewritten to the invalid state according to the second occupation control signal OCC. Then, the occupied state of the partition PRT0 is canceled from a processing cycle t8 upon rewriting the value of the register 36. For that reason, after the processing cycle t8, in the period where the partition PRT0 is selected, the hardware threads HT0 and HT1 are repetitively selected.

In the operation example illustrated in FIG. 11, the unoccupied state of the partition PRT1 and the CPU is maintained. That is, the partition PRT1 can maintain the processing performance (for example, real time property) without being subject to an influence that the partition PRT1 becomes in the occupied state.

Figure 12:
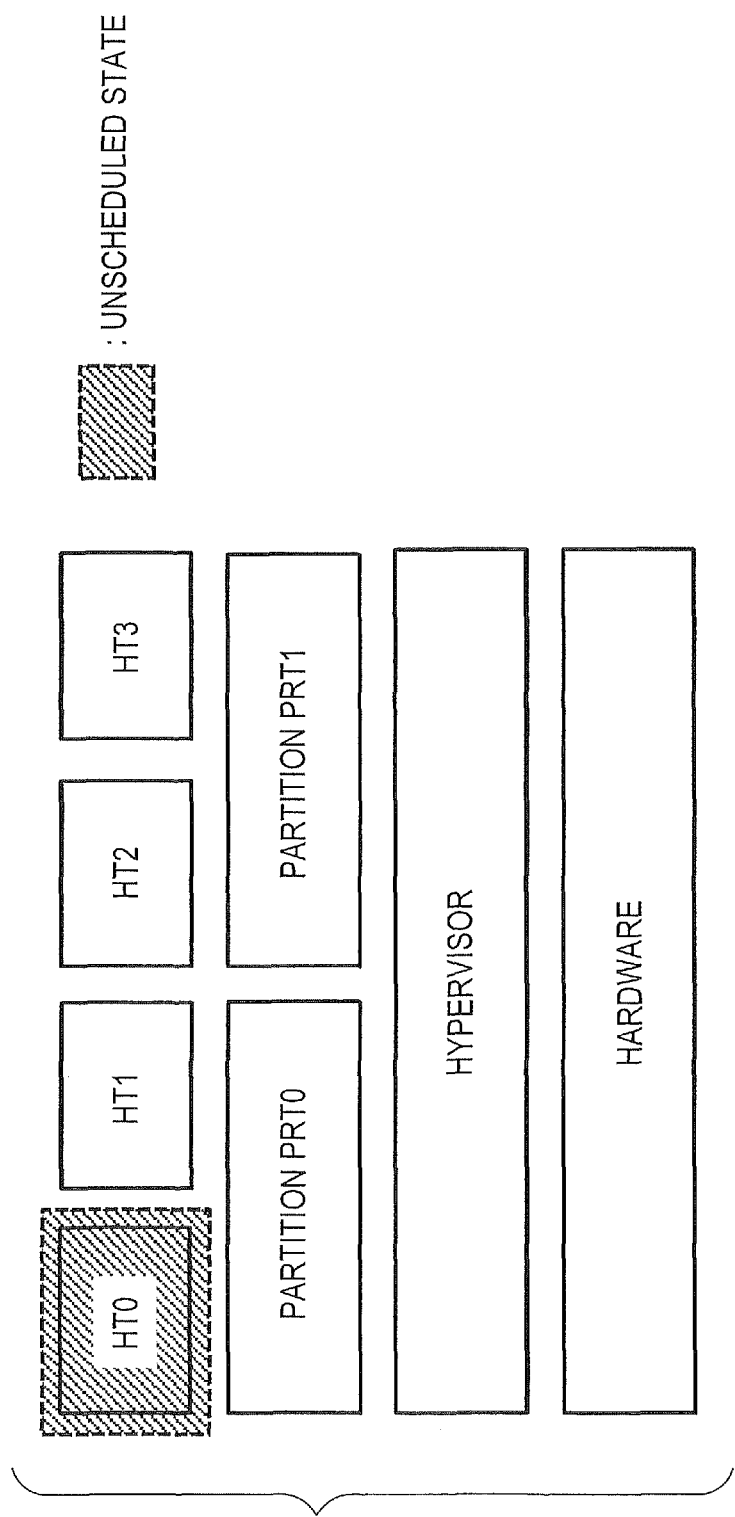
FIG. 12 is a diagram illustrating the software hierarchy of the semiconductor device in an HT1 occupied period of the timing chart illustrated in FIG. 11.

A diagram illustrating a software hierarchy of the semiconductor device in the HT1 occupied period of the timing chart illustrated in FIG. 11 is illustrated in FIG. 12. As illustrated in FIG. 12, in the HT1 occupied period illustrated in FIG. 11, the hardware thread HT0 becomes in an unscheduled state, and becomes in the occupied state where the execution time (for example, hardware resource) assigned to the partition PRT0 is dominated.

Figure 13:
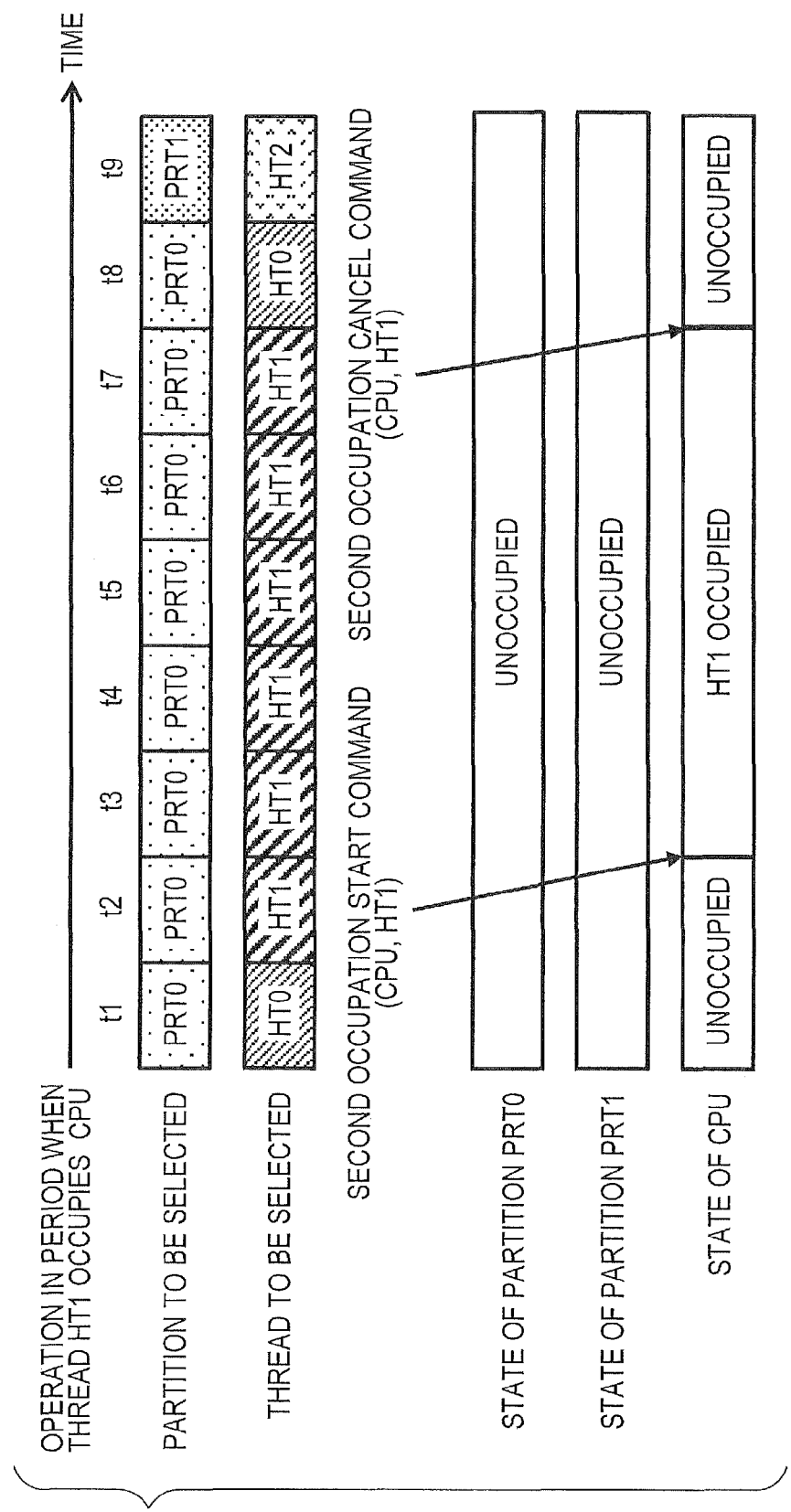
FIG. 13 is a timing chart illustrating the operation of the semiconductor device when there is a period where the thread occupying a CPU is present according to the first embodiment.

A timing chart when the semiconductor device 1 that operates on the basis of the schedule illustrated in FIG. 8 operates in a period where the hardware thread HT1 occupies the CPU 10 is illustrated in FIG. 13. As illustrated in FIG. 13, in the operation example, the hardware thread HT1 selected in the processing cycle t2 issues the second occupation start instruction for allowing the execution time of the CPU 10 to be occupied by the hardware thread HT1. Then, in response to the second occupation start instruction, the execution unit 17 outputs the occupation control signal OCC (for example, the third occupation control signal OCC) with the hardware thread HT1 occupying the CPU 10 as the second occupation hardware thread No. In the partition scheduler 24 of the scheduler 19, the second occupied state flag of the register 47 is rewritten to the valid state according to the third occupation control signal OCC, and the hardware thread HT1 is stored in the register 48 as the second occupation hardware thread No. Then, the CPU 10 is occupied by the hardware thread HT1 from the processing cycle t3 upon rewriting the values of the registers 47 and 48. For that reason, in a period from the processing cycle t3 to the issuance of the second occupation cancel instruction, only the partition PRT0 is selected. Also, in the period where the CPU is occupied, only the hardware thread HT1 is selected.

Then, upon issuance of the second occupation cancel instruction by the hardware thread HT1 selected in the processing cycle t7, the execution unit 17 outputs the occupation control signal OCC (for example, the fourth occupation control signal OCC) for canceling the occupied state by the hardware thread HT1 of the CPU 10. In the thread scheduler 21 of the scheduler 19, the second occupied state flag of the register 47 is rewritten to the invalid state according to the fourth occupation control signal OCC. Then, the occupied state of the CPU 10 is canceled from the processing cycle t8 upon rewriting the value of the register 47. For that reason, after the processing cycle t8, in the period where the partition PRT0 is selected, the hardware threads HT0 and HT1 are repetitively selected, and in the period where the partition PRT1 is selected, the hardware threads HT2 and HT3 are repetitively selected. In the operation example illustrated in FIG. 13, the unoccupied state of the partitions PRT0 and PRT1 is maintained.

A diagram illustrating a software hierarchy of the semiconductor device in the HT1 occupied period of the timing chart illustrated in FIG. 13 is illustrated in FIG. 14. As illustrated in FIG. 14, in the HT1 occupied period illustrated in FIG. 13, the hardware thread HT0 and the partition PRT1 become in the unscheduled state, and becomes in the occupied state where the hardware thread HT0 dominates the hardware resource such as the CPU.

From the above description, in the semiconductor device 1 according to the first embodiment, when the first occupation start instruction is executed in the execution unit 17, the execution unit 17 outputs the first occupation control signal OCC for designating the hardware thread that occupies one partition. Also, the scheduler 19 outputs the thread select signal TSEL for designating the hardware thread issued for the execution unit 17, and fixes the hardware thread designated by the thread select signal TSEL to the period selected by one partition according to the first occupation control signal OCC. With this operation, in the semiconductor device 1 according to the first embodiment, the state can be switched to the occupied state or the unoccupied state for each of the partitions not through the OS (operating system) or the host system such as the partition manager.

A description will be given of a problem arising when the partition division and the hardware thread control are conducted with no use of the control of the hardware thread by the scheduler 19, but, for example, through the OS or the host system such as the partition manager disclosed in Japanese Unexamined Patent Application Publication No. 2004-326749. In this case, information on which hardware thread is assigned to the partition is provided in the host system. For that reason, there arises such a problem that, in order to switch whether one partition is occupied by one hardware thread, or shared by multiple hardware threads, an independence between the respective partitions cannot be ensured without inquiring of the host system once. When the occupied state is not switched for each of the partitions, only switching of whether the execution time of the CPU 10 is shared by multiple hardware threads, or occupied can be conducted, resulting in such a problem that it is difficult to estimate the execution time for each of the hardware threads.

However, in the semiconductor device 1 according to the first embodiment, the state can be switched between the occupied state and the unoccupied state for each of the partitions not through the host system. As a result, the semiconductor device 1 can conduct the switching processing without consuming the execution time of the CPU for switching between the occupied state and the unoccupied state of the partition. Also, the semiconductor device 1 can prevent the processing capacity from be deteriorated by switching between the occupied state and the unoccupied state of the partition. Further, in the semiconductor device 1, the execution time of the CPU is not consumed for switching between the occupied state and the unoccupied state of the partition. Therefore, the execution times of the hardware thread occupying the partition and the hardware thread in which the execution is stopped can easily be estimated.

Further, in the semiconductor device 1, because the occupied state and the unoccupied state can be switched for each of the partitions, the state of the other partition can be switched while the operation of one partition is maintained. Thus, in the semiconductor device 1, because the independence of the partitions can be ensured not through the processing of the host system, the execution time for each of the partitions can be easily estimated. Also, in the semiconductor device 1, the real time property of the partition whose occupied state is not to be switched can be maintained.

Also, in the semiconductor device 1, the hardware thread assigned to the partition is set by the thread assignment table 16. The thread assignment table 16 is configured by the register in which the setting value is rewritable as illustrated in FIG. 2. For that reason, in the semiconductor device 1, the number of hardware threads to be assigned to the partitions can be changed without changing the hardware.

Also, in the partition setting register VMPRTn configuring the thread assignment table 16 in the semiconductor device 1 is stored only the lower limit value of the hardware thread which is assigned to the partition. Also, in the semiconductor device 1, the dispatch unit 15 refers to multiple fields in the partition setting register VMPRTn to recognize a range of the hardware thread assigned to one partition. In this situation, the dispatch unit 15 calculates the upper limit value of the hardware thread assigned to the first partition by subtracting 1 from the lower limit value of the hardware thread assigned to the second partition logically adjacent to the first partition. That is, the dispatch unit 15 can recognize the range of the hardware thread assigned to the partition by only a simple calculation using a simple circuit. Thus, the range of the hardware thread assigned to the partition is recognized by simple setting of the register and the simple calculation with the result that the semiconductor device 1 can reduce the circuit area of the dispatch unit 15 and the thread assignment table 16.

Also, in the semiconductor device 1, when the second occupation start instruction is executed in the execution unit 17, the execution unit 17 outputs the third occupation control signal OCC for designating the hardware thread occupying the execution time of the CPU 10. Then, the scheduler 19 fixes the hardware threads designated by the thread select signal TSEL to one according to the third occupation control signal OCC. That is, in the semiconductor device 1, if there is the hardware thread requiring the high processing capacity, the high speed processing can be realized by using all of the processing capacity of the CPU 10.

The present invention is not limited to the above embodiments, but can be appropriately changed without departing from the spirit of the invention. For example, in the above embodiments, the thread schedules and the partition schedules are set by the thread schedule table 30 and the partition schedule table 40. However, for example, the thread schedules and the partition schedules can be set by arithmetic processing of an arithmetic circuit.

Also, in FIG. 1, the dispatch unit 15 is disposed downstream of the instruction fetch unit, but the dispatch unit 15 can be disposed upstream of the instruction fetch unit. In this case, the dispatch unit 15 controls the order of the fetch processing of the instruction fetch unit.

What is claimed is:

1. A semiconductor device, comprising:
a plurality of hardware threads that each issues an independent instruction flow;
an execution unit that executes an arithmetic instruction belonging to the instruction flow issued by any one of the plurality of hardware threads; and
a scheduler that includes a plurality of first setting registers provided in correspondence with a plurality of partitions and defining a correspondence relationship between the hardware threads and the partitions, and generates a thread select signal on the basis of a partition schedule defining a rate of execution times of the respective partitions, and a thread schedule defining a rate of execution times of the respective hardware threads within the execution time assigned to each of the partitions,
wherein the scheduler outputs the thread select signal designating a hardware thread indicated by a first occupation control signal as the hardware thread selected, and wherein the thread select signal is output during the execution time assigned to the partition which is indicated by the first occupation control signal, according to the first occupation control signal output by the execution unit when the arithmetic instruction executed in the execution unit is the first occupation start instruction for occupying the execution time assigned to any one of the partitions.

2. The semiconductor device according to claim 1, wherein the scheduler includes a plurality of thread schedulers each of which corresponds to one of the plurality of partitions, and outputs the thread select signal including a hardware thread number for identifying the hardware thread belonging to the corresponding partition.

3. The semiconductor device according to claim 2, wherein each of the plurality of thread schedulers includes one of the plurality of first setting registers, and
wherein each thread scheduler includes:
a first setting register that stores the hardware thread numbers of the hardware threads assigned to the corresponding partition therein, and defines the thread schedule;
a first selector that selects any one of the hardware thread numbers stored in the first setting register on the basis of the thread scheduler;
a first control register that stores a first occupied state flag indicative of a valid state when the first occupation control signal indicates the partition corresponding to the subject thread scheduler therein;
a second control register that stores a first occupation hardware thread number for identifying the hardware thread indicated by the first occupation control signal therein;
and
a second selector that outputs the hardware thread number selected by the first selector when the first occupied state flag is in an invalid state as the thread select signal, and outputs the occupation hardware thread number stored in the second control register when the first occupied state flag is in the valid state as the thread select signal.

4. The semiconductor device according to claim 2, wherein each of the plurality of thread schedulers outputs a hardware thread number determined on the basis of the thread scheduler as the thread select signal according to a second occupation control signal output by the execution unit when the arithmetic instruction executed by the execution unit is a first occupation cancel instruction for canceling the occupied state of the execution time assigned to any one of the partitions.

5. The semiconductor device according to claim 2, wherein the scheduler outputs the thread select signal including a second occupation hardware thread number corresponding to the hardware thread indicated by a third occupation control signal without depending on the thread schedule and the partition schedule according to the third occupation control signal output by the execution unit when the arithmetic instruction executed by the execution unit is a second occupation start instruction occupying all of the execution time of the execution unit.

6. The semiconductor device according to claim 5, wherein the scheduler includes a partition scheduler that selects the partition that generates the arithmetic instruction in a subsequent processing cycle, and
wherein the partition scheduler includes:
a third selector that outputs the partition number corresponding to the partition which generates the arithmetic instruction in the subsequent processing cycle on the basis of the partition schedule;
a fourth selector that selects any one of the thread select signals output by the thread scheduler corresponding to the partition number;
a third control register that stores a second occupied state flag which becomes the valid state according to the third occupation control signal therein;
a fourth control register that stores a second occupation hardware thread number for identifying the hardware thread indicated by the third occupation control signal; and
a fifth selector that outputs the thread select signal selected by the fourth selector when the second occupied state flag is in the invalid state, and outputs the second occupation hardware thread number stored in the fourth control register when the second occupied state flag is the valid state, as the thread select signal.

7. The semiconductor device according to claim 6, wherein the partition scheduler outputs the thread select signal determined on the basis of the thread schedule and the partition schedule, according to a fourth occupation control signal output by the execution unit when the arithmetic instruction executed in the execution unit is a second occupation cancel instruction for canceling a state in which one of the hardware threads occupies all of the execution time of the execution unit.

8. The semiconductor device according to claim 1, further comprising a thread assignment table indicative of a correspondence relationship between the partitions and the hardware threads.

9. The semiconductor device according to claim 8, wherein, at the time of an initializing process, the semiconductor device reads a setting value indicative of a correspondence relationship between the partition and the hardware thread from a nonvolatile storage device, and stores the setting value in the thread assignment table, and writes the setting of the thread schedule in the first setting register on the basis of the thread assignment table.

10. The semiconductor device according to claim 8, further comprising: a dispatch unit that selects one of the arithmetic instructions generated by the plurality of hardware threads according to the thread select signal,
wherein the thread select signal includes a hardware thread number corresponding to the hardware thread that issues the arithmetic instruction in the subsequent processing cycle, and a partition number corresponding to the partition to which the hardware thread issuing the arithmetic instruction belongs, and
wherein the dispatch unit determines whether the combination of the partition number and the hardware thread number of the thread select signal matches a combination defined in the thread assignment table, or not, and stops the issuance of the arithmetic instruction to the execution unit if the determination result is indicative of mismatch.

11. The semiconductor device according to claim 8, wherein the thread assignment table includes a partition setting register that defines the hardware thread belonging to the partition,
wherein the partition setting register stores a base thread identifier (ID) indicative of a lower limit value of the hardware thread belonging to the partition therein, and
wherein a partition assignment unit recognizes a scope of the hardware thread belonging to the one partition on the basis of the base thread ID of a first partition and the base thread ID of a second partition logically adjacent to the first partition.

12. A semiconductor device that assigns a plurality of hardware threads, each issuing an independent instruction flow to any one of a plurality of partitions, each logically defined, and executes the hardware threads, the semiconductor device comprising:

an execution unit that executes an arithmetic instruction belonging to the instruction flow issued by a hardware thread selected from the plurality of hardware threads according to a thread select signal; and a scheduler that includes first setting registers provided in correspondence with the plurality of partitions and each register storing a thread schedule defining a correspondence relationship defining an assignment of execution time of the hardware thread within the corresponding partition therein, and generates the thread select signal on the basis of the thread schedule, wherein the scheduler further includes a first control register, and outputs the thread select signal designating a specific hardware thread without depending on the thread schedule when the first control register is set to a setting value indicating that one partition is in an occupied state.

* * * * *